United States Patent [19]
Barry

[11] Patent Number: 5,170,533
[45] Date of Patent: Dec. 15, 1992

[54] DETACHABLE HANDLES FOR BABY BOTTLES

[75] Inventor: Jon B. Barry, Baton Rouge, La.

[73] Assignee: Generik Ink, Inc., Baton Rouge, La.

[21] Appl. No.: 683,605

[22] Filed: Apr. 10, 1991

[51] Int. Cl.⁵ .................. B65D 25/28; B65D 23/12
[52] U.S. Cl. .................. 16/114.00 R; 16/125; 16/DIG. 24; 215/100 A
[58] Field of Search ............ 16/114 R, 124, 125, 16/DIG. 24; 215/100 A, 11.1

[56] References Cited

U.S. PATENT DOCUMENTS

| | | | |
|---|---|---|---|
| 1,608,088 | 11/1926 | Duncan | 16/125 |
| 1,617,213 | 2/1927 | LaPaugh | 215/100 A |
| 1,671,328 | 5/1928 | Sturm et al. | 16/125 |
| 2,157,251 | 5/1939 | Tinnerman | 16/125 |
| 4,281,770 | 8/1981 | Rainville | 215/100 A |

FOREIGN PATENT DOCUMENTS 7552 of 1902 United Kingdom ............. 16/114 R

*Primary Examiner*—John Sipos
*Assistant Examiner*—Carmine Cuda
*Attorney, Agent, or Firm*—Charles B. Schmitz

[57] ABSTRACT

Handles formed to fit various shapes, sizes, and designs of baby bottles available on the market. The handles aid in holding the bottle in proper feeding positions. The handles' unique design allows attachment and detachment, thus making the handles reusable. The attachment is by way of lugs positioned on the edge of the handles and various bottles will utilize different combinations of the lugs.

15 Claims, 6 Drawing Sheets

DETACHABLE HANDLES FOR BABY BOTTLES

BACKGROUND OF THE INVENTION

The field of this invention relates to handles for bottles and more particularly to a new and novel design for a handle for a baby bottle to facilitate the use of the baby bottle by the infant.

The normal type of baby bottle is basically cylindrical in construction and includes a cap through which a rubber nipple has been passed. The basically cylindrical shape of the baby bottle has been found to be difficult to grasp by a newborn infant. The bottle may frequently slide from the infant's hands as the infant's hands are just not large enough to extend around the bottle and establish a firm grip.

Baby bottles generally are constructed with a body having a tubular configuration of a diameter much too large for effective gripping by the small hands of a baby who will use the bottle for feeding. Usually, such bottles are manipulated by the baby grasping the bottle between the baby's hands, but each hand alone is not large enough to establish a firm grip on the bottle. As a result, the bottle often will elude the baby's grip and the baby will become discouraged from holding the bottle at an appropriate position for feeding. The result is that the infant keeps dropping the bottle and normally cannot readily find the bottle himself which then requires that an adult pick up the bottle and replace the bottle in position for the infant.

It would be desirable to design some form of a handle means which would greatly facilitate the holding of the baby bottle by the infant. One possibility would be to form the handles on the bottles at manufacture, however the desired lightweightness of baby bottles has prevented success in doing this because the additional handle formation adds too much weight. Various designs have tried to add handles to bottles but with little success. The need for strength and flexibility combined with a need for low cost and dependability have prevented anyone from successfully designing detachable handles for baby bottles.

The novel, nonobvious invention of this disclosure provides handle means, both detachable and reusable that fits all bottles on the current market and solves the problems encountered by previous designs. The unique device of this invention utilizes the pre-cut slots already on the bottles for viewing contents so that the handles need nothing additional for attachment to the bottle. Although the bottles on the market have various styles of pre-cut slots, this invention will fit them all.

SUMMARY OF THE INVENTION

The present invention relates generally to baby bottles and pertains, more specifically, to providing a baby bottle with separable handles for assisting a baby in gripping the bottle so that the baby is encouraged to hold the bottle in appropriate position during feeding.

The utilization of handles and other handgrip configurations in connection with bottles and other drinking vessels is notoriously old; however, no separable handles have been available to fit a wide array of sizes and shapes of baby bottles with the separable handles having a specific contour and orientation best suited to encourage a baby to hold the bottle alone in appropriate position for feeding, with comfort, and without the potential for injury.

The handles of this invention disclosure can be made in a rainbow of colors, and are baby safe, non-toxic, and dishwasher safe. They have an easy attachment feature, locking in tight so baby cannot pull them off.

This invention is not just for baby, Mom and Dad benefit too, giving them a free hand at feeding time, and an easier reach when their arms are full. This invention makes it easier to pick up any bottle, as the unique lugs adapt to various sizes and styles of bottles, even designed for both glass and plastic "fill" bottles. The separable handles of this invention are sure to make both parents and baby happier and make for a more enjoyable feeding time.

A primary objective of the subject matter of this invention is to provide a handle to be employed in conjunction with many sizes and shapes of baby bottles which facilitates holding of the baby bottle in the drinking position solely by the infant.

Another objective of this invention is to provide handles that do not include any sharp corners so as to be absolutely safe for use by the infant and deterring the possibility that there would be any sharp corner which would penetrate the infant's eyes or do anything to injure the infant.

Another objective of the handle of this invention is to save time for the mother of the infant by permitting the infant to feed himself at an earlier age.

A further objective of this invention is to provide handles that assist in the education of the infant in order to teach the infant to raise the baby bottle in order to extract the drinking liquid therefrom.

A primary aspect of this invention relates to means for attaching the handles to bottles and has particular reference to a method of attaching separable handles to a variety of baby nursing bottles. Thus, a principle object of this invention is to provide simple and novel means for securing the handles to the bottle, which operation can be quickly and easily accomplished without danger of the handles becoming accidentaly detached after securing the same to the bottle. They lock on the bottle tightly so baby cannot pull them off.

A further object of this invention is to provide novel securing means whereby the handles can be readily attached without danger of breakage of the bottle during the securing or attaching operation.

Still another object of the present invention is to provide a baby bottle with handles designed to be reused on various sizes and shapes of baby bottles, thus being economical and efficient. One set of the handles of this invention are enabled to fit many styles of bottles on the market by way of a unique non-obvious lug system engaging the bottle.

Another object of the invention is to provide a baby bottle with handles having a contour and configuration enabling effective gripping by a baby's hands with comfort.

Still another object of the invention is to provide a baby bottle with handles oriented for appropriate positioning of the bottle by the baby for proper feeding.

Another object of this invention is to provide separable handles for baby bottles that are composed of non-toxic materials, are diswasher safe and easily cleaned, can be designer colors.

Yet another object of the invention is to provide a baby bottle with separable handles in a relatively simple construction which is inexpensive to manufacture in large quantities of consistent high quality.

IN THE DRAWINGS

The novel features of the present invention are set forth with particularity in the appended claims. The invention will be understood more fully, while further objects and advantages will become apparent, in the following detailed description of embodiments of the invention illustrated in the accompanying drawings in which:

DETAILED DESCRIPTION OF THE PREFERRED EMBODIMENT

Figure 1:
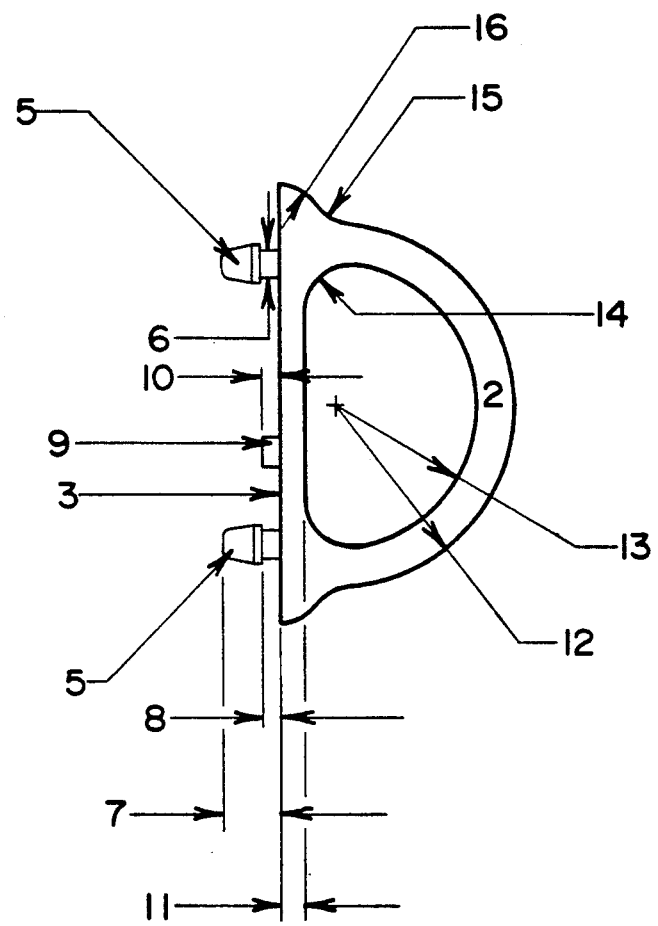
FIG. 1 represents a side view of the device.

Turning now to the drawings and first to FIG. 1, a preferred embodiment of a novel and nonobvious detachable handle for baby bottles A semicircular ring member 2 is shown fixed to a flat attachment member 3. The ends 4 of the flat attachment member 3 extend beyond the points of fixation to the semicircular ring member 2.

A plurality of lugs with heads 5 are fixed to the flat attachment member 3. In this preferred embodiment two lugs with heads 5 are provided. The lugs with heads 5 have a shaft portion with width 6 and length 8. This shaft portion is rectangular with width 6 ideally between 1/6 inch and 1/5 inch and best between 0.185 plus or minus 0.003 inch, and length 8 ideally between 1/20 inch and 1/10 inch and best between 0.078 plus or minus 0.003 inch. The total length 7 of lugs with heads 5 is ideal 0.250 inch.

A plurality of rectangular lugs 9 are fixed to the flat attachment member 3. In this preferred embodiment one rectangular lug 9 is provided fixed between the lugs with heads 5. The length 10 of this rectangular lug 9 is ideally between 1/16 inch and 1/8 inch and best at 7/64 inch.

The width 11 of the flat attachment member 3 is ideally 0.187 inch. The ends 4 of the flat attachment member 3 are rounded and the outside radius 16 at the points of fixation to the semicircular ring member 2 is ideally 1/4 inch, while the inside radii 14,15 at the points of fixation are ideally 1/4 inch.

The inside radius 13 of the semicircular ring member 2 is ideally 13/16 inch and the outside radius 12 of the semicircular ring member 2 is ideally 17/16 inch.

Figure 2:
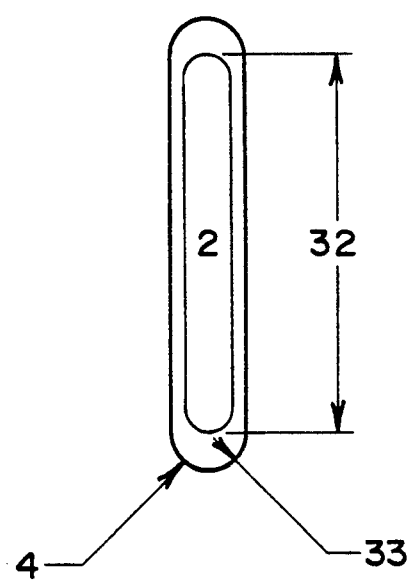
FIG. 2 represents an end view of the device from the semicircular ring member end.

Now turning to FIG. 2 which is an end view of the novel and nonobvious invention of this disclosure from the perspective of the semicircular ring member 2 end, the end 4 of the flat attachment member 3 can be seen. The length 32 of the semicircular ring member 2 is ideally 17/8 inch. The outside radius 33 of the end 4 of the flat attachment member 3 is ideally 0.187 inch.

Figure 3:
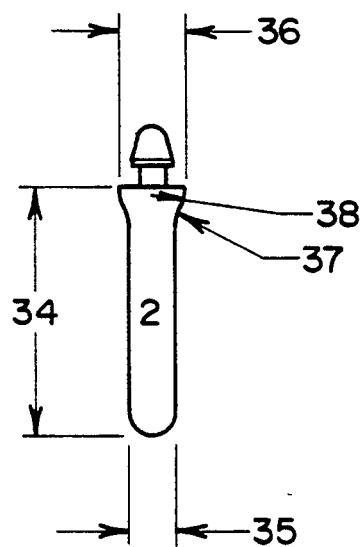
FIG. 3 represents a top view of the device.

Now turning to FIG. 3 which is a top view of the novel and nonobvious invention of this disclosure. The semicircular ring member 2 is comprised of a rod with the diameter 35 of the semicircular ring member 2 ideally 1/4 inch. The inside radius 37 and outside radius 38 at the point of fixation of the flat attachment member to the semicircular ring member 2 are ideally 1/4 inch. The width 36 of the of the flat attachment member is ideally 3/8 inch. The total length 34 of the flat attachment member and the semicircular ring member 2 is ideally 11/8 inch.

Figure 4:
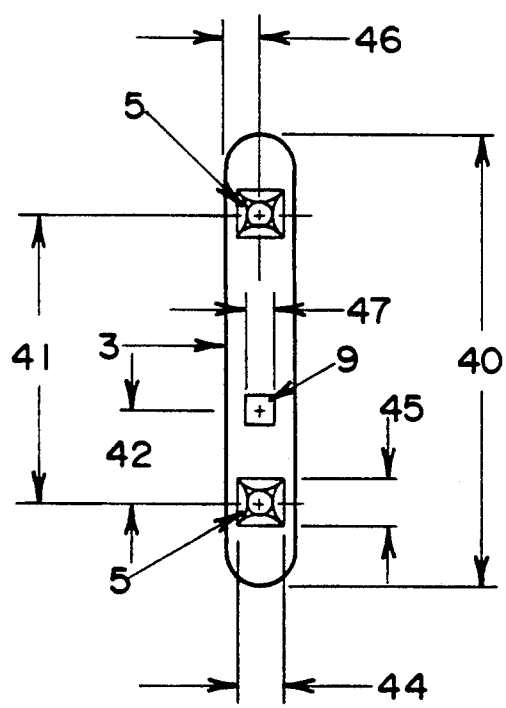
FIG. 4 represents an end view of the device from the attachment end.

Now turning to FIG. 4 which is an end view of the novel and nonobvious invention of this disclosure from the perspective of the flat attachment member 3 end, the configuration of the lugs with heads 5 and rectangular lug 9 can be seen. The length 40 of the flat attachment member 3 is ideally 5/2 inch. The distance 41 between the lugs with heads 5 is ideally between 1.621 plus or minus 0.005 inch. The distance 42 between one lug with head 5 and the rectangular lug 9 is ideally between 0.536 plus or minus 0.005 inch.

The head of each lug with head 5 has width 44 ideally between 0.255 plus or minus 0.003 inch, and height 45 ideally between 0.225 plus or minus 0.003 inch. The lugs with heads 5 and rectangular lug 9 are positioned in one axis in the center of the flat attachment member 3 at a distance 46 from the edge of the flat attachment member 3 to the center of each lug ideally 0.187 inch. The rectangular lug 9 has a square head with width 47 ideally between 0.182 plus or minus 0.015 inch.

Figure 5:
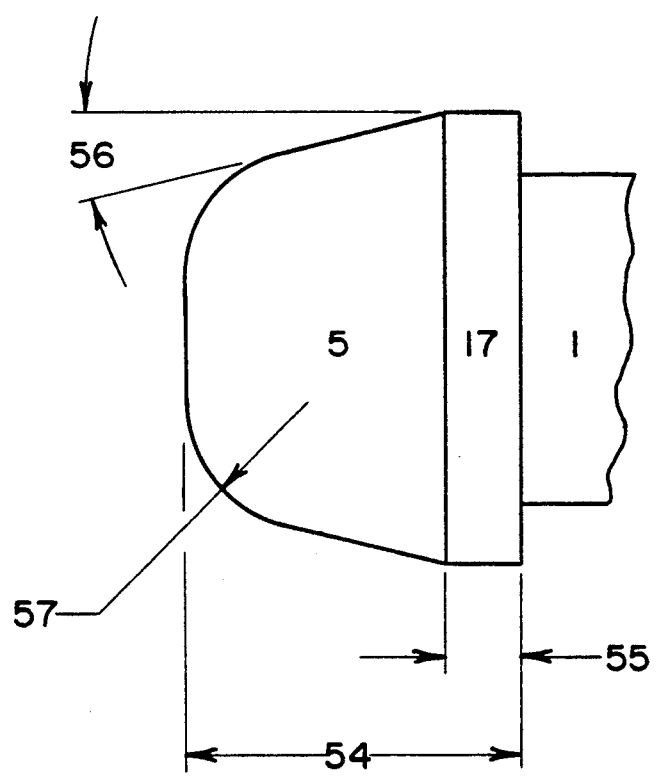
FIG. 5 represents an enlargement of one of the lugs with a head.
Figure 6:
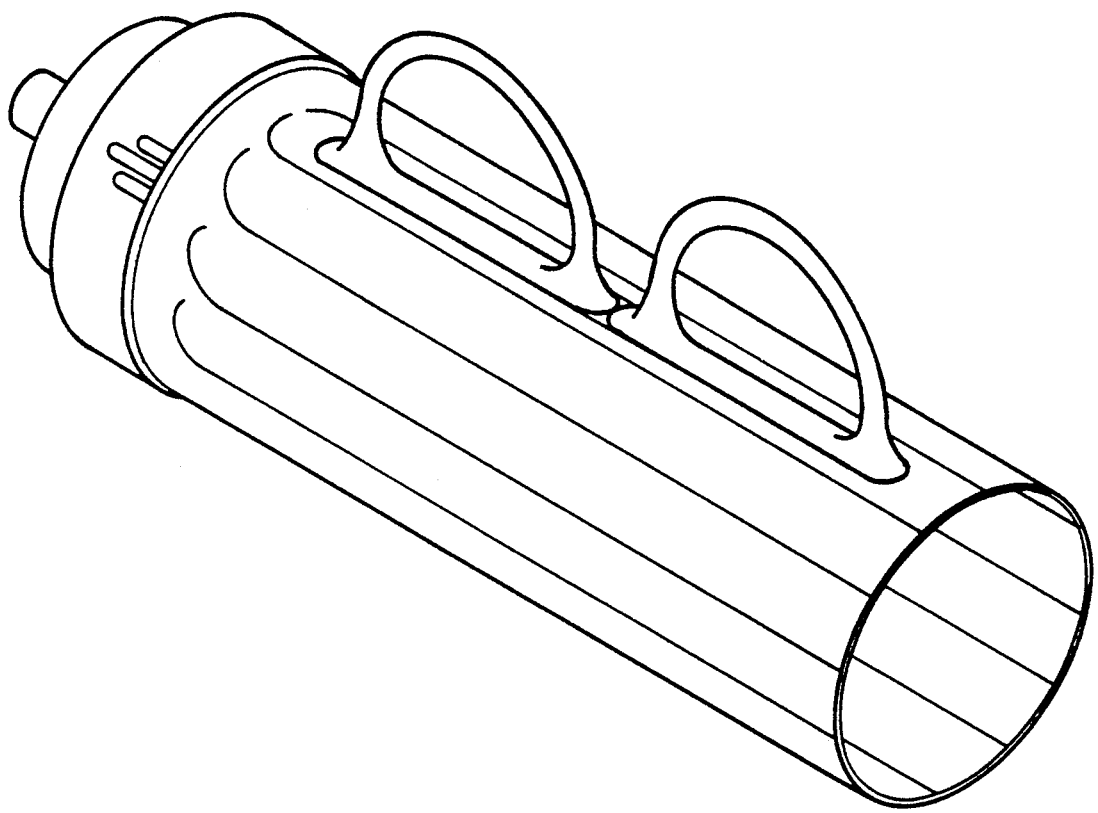
FIG. 6 represents a pair of handles including two semi-circular ring members being used in tandem on a single baby bottle.

Now turning to FIG. 5 which represents an enlargement of one of the lugs with a head 5, the shaft portion 1 of the lug with head is shown in partial. The head of the lug with head 5 has a height 54 of ideally 0.172 inch. The head is comprised of a square band 17 of width 55 ideally 0.040 inch and a square tip with taper 56 of ideally 10 degrees on each face. At the intersection of each face of the square tip the edge is rounded to an inner radius 57 ideally 0.008 inch.

This novel and nonobvious invention provides handles which are readily attached to and detached from a baby bottle and when placed on the bottle provides handles which may be conveniently grasped and held by the small hands of a baby of nursing age. The handle fits pre-cut slots on the bottle.

This invention can be made in a rainbow of colors, and due to its design and the choice of plastic for fabrication is baby safe, non-toxic, and dishwasher safe. Their detachable snap-on/snap-off feature, makes them lock-in tight so baby cannot pull them off while allowing for detachability for reuse.

This invention will fit all available bottles on the market including liner bottles. This novel nonobvious invention with its lug attachment system has been designed specifically for both glass and plastic "fill" bottles. A pair of handles may be used in tandem of a single baby bottle.

To attach the novel handles of this invention grasp the baby bottle firmly with one hand and insert the lugs on the flat attachment member of the handle into the pre-cut slots in the side of the baby bottle. The lugs will fit into different styles of bottles in different manners but the fit will be tight and stable no matter the style of bottle. Repeat for the second handle. The handles can slide up and down for comfort adjustment depending upon the style of bottle.

Remove the handles by grasping the bottle firmly with one hand and pulling the handle free with the other. The lugs will snap out of the pre-cut slots and allow detachment without damage to the bottle or handle.

In actual practice, it has been exceedingly difficult to cast or form integral guideways or handles near the center of a baby bottle surface, as this operation necessitates a thick heavy bottle, in order to prevent excessive amounts of breakage in producing the bottle. It is apparent that an infant's bottle should be of light-weight material and thus it has been practically impossible to obtain a light-weight nursing bottle with guideways or handles formed thereon.

Therefore separable handles for a light-weight, cheap bottle, such as a nursing bottle are a great improvement to the current market. To secure, by lugs fixed to a detachable handle, a handle on the baby bottle as the bottle is available on the market allows the user to improve the current baby bottle and its use.

Some of these lugs are provided with heads and tapered to provide a snap on/snap off effect. A handle which is circular in cross-section throughout the greater portion of its length and is equipped with two lugs with heads producing the snap on/snap off mount and a third lug to lock the handle in place on the pre-cut slots in the bottle is provided by this invention disclosure. This handle is made of pliable material such as plastic, thus the lugs will, upon sufficient pressure being exerted thereon, snugly engage the pre-cut slots on the bottle and due to the heads of some lugs, a positive gripping or binding of the parts will be accomplished.

It will be evident from this construction that the possibility of accidental displacement of the handle from the bottle will be reduced to a minimum, for lateral displacement cannot be obtained due to the close fit between the sides of the bottle and the flat attachment member of the handle.

While only a particular embodiment of the present invention and one mode of practicing the invention have been shown and described, it is apparent that changes and modifications may be made without departing from this invention in its broader aspects, therefore the aim in the appended claims is to cover all such changes and modifications as fall within the true spirit and scope of this invention.

What is claimed:

1. Handle for a baby bottle comprising: a semi-circular ring member which is circular in cross-section throughout the greater portion of its length, a flat attachment member fixed to the ends of said semi-circular ring member, and a plurality of lugs formed on said attachment member opposite said semi-circular ring member, some of said lugs having heads and at least one of said lugs being without a head.

2. The handle of claim 1 wherein one said lug without a head is rectangular and positioned between two of said lugs with heads.

3. The handle of claim 1 wherein said lugs with heads have tapered heads formed larger than their shafts.

4. The handle of claim 1 wherein said lugs with heads have heads formed to exert a cam action upon a passage when inserted into said passage, said heads formed to obtain less cam action at the rear of said head so that it cannot be pulled out of said passage as easily as it is inserted.

5. The handle of claim 1 wherein said attachment member extends out past said ring member on its ends and is rounded on its ends.

6. The handle of claim 5 wherein said ring member is a semi-circle of inner radius 13/16 inch and outer radius 17/16 inch.

7. The handle of claim 2 wherein said rectangular lug is from 1/16 inch to ⅛ inch in length and from radius 0.167 inch to 0.197 inch on each side.

8. The handle of claim 3 wherein said lugs with heads have said shafts which are rectangular measuring from 1/20 inch to 1/10 inch in length and have width measuring from 1/6 inch to 1/5 inch.

9. The handle of claim 3 wherein said lugs with heads have heads with width of from 0.252 inch to 0.258 inch on one side and from 0.222 inch to 0.228 inch on the other side.

10. The handle of claim 3 wherein said lug heads are tapered at a 10 degree pitch.

11. The handle of claim 10 wherein said 10 degree taper begins at a point 0.040 inch from the junction of said lug head and said shaft.

12. Handles for a baby bottle comprising two semi-circular ring members which are circular in cross-section throughout the greater portion of their length, with flat attachment members fixed to the ends of each said semi-circular ring member, and a plurality of lugs formed on each said attachment member opposite said semi-circular ring member, some of said lugs having heads and on each said attachment at least one of said lugs being without a head, and said two ring members being used in tandem.

13. Handle for a baby bottle comprising: a semi-circular ring member, a flat attachment member fixed to said semi-circular ring member, and a plurality of lugs fixed to said attachment member, some of said lugs have heads and at least one lug without a head is positioned between two of said lugs with heads.

14. The handle of claim 13 wherein said lug without head is positioned between 0.531 inch and 0.541 inch from one said lug with head.

15. The handle of claim 13 wherein said plurality of lugs is positioned in an axis through the center of said attachment member lengthwise and at least two lugs have tapered heads and one lug is rectangular, without a head and positioned between said two lugs with heads.

* * * * *